US012621344B2

(12) United States Patent　　　　(10) Patent No.:　US 12,621,344 B2

Modalavalasa　　　　　　　　　　　　(45) Date of Patent:　　　May 5, 2026

(54) BOT DETECTION AND MITIGATION USING DYNAMIC WEB FLOWS BUILT VIA MACHINE LEARNING

(71) Applicant: Akamai Technologies, Inc., Cambridge, MA (US)

(72) Inventor: Venkata Sai Kishore Modalavalasa, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 55 days.

(21) Appl. No.: 18/678,578

(22) Filed: May 30, 2024

(65) Prior Publication Data

US 2025/0373655 A1　　Dec. 4, 2025

(51) Int. Cl.
G06F 21/00　　　　(2013.01)
H04L 9/40　　　　(2022.01)

(52) U.S. Cl.
CPC ...... H04L 63/1466 (2013.01); H04L 63/1425 (2013.01)

(58) Field of Classification Search
CPC .................. H04L 63/1466; H04L 63/1425
See application file for complete search history.

(56) References Cited

U.S. PATENT DOCUMENTS

| | | | |
|---|---|---|---|
| 8,806,646 B1 | 8/2014 | Daswani et al. | |
| 10,587,629 B1 | 3/2020 | Kurupati et al. | |
| 10,686,818 B2 | 6/2020 | Kurupati | |
| 10,708,281 B1 | 7/2020 | Modalavalasa | |

| | | | |
|---|---|---|---|
| 11,245,722 B1 | 2/2022 | Senecal et al. | |
| 11,368,483 B1 | 6/2022 | Senecal et al. | |
| 11,374,945 B1 | 6/2022 | Senecal et al. | |
| 11,870,804 B2 | 1/2024 | Kurupati | |
| 12,255,916 B2 | 3/2025 | Costa et al. | |

(Continued)

FOREIGN PATENT DOCUMENTS

KR　　1020220078320 A　　6/2022

OTHER PUBLICATIONS

Fan et al ("HoneyDecoy: A Comprehensive Web-Based Parasitic Honeypot System for Enhanced Cybersecurity", The 2023 IEEE International Conference on Privacy Computing and Data Security). (Year: 2023).*

(Continued)

*Primary Examiner* — Michael M Lee
(74) *Attorney, Agent, or Firm* — David H. Judson

(57)　　　　ABSTRACT

An overlay network bot detection service is augmented to include a content generation service that dynamically generates dummy web pages that are served (along with real site content) to a requesting user, This content is built using machine learning models trained on a target website's content, or that otherwise leverage generative AI to create site content that mimics the site's real content. The generated content is preferably built dynamically during an actual interaction session with the requesting user, is designed to "look" and "feel" like actual content of the website, and inclusion of the content acts to trap a requesting user's browser in one or more non-productive (fake) navigation loops within the site. This facilitates the overall bot detection because such content and such loops are not actually part of the real site, and thus the navigation of these unproductive pages is highly indicative of bot activity.

20 Claims, 7 Drawing Sheets

(56)  References Cited

U.S. PATENT DOCUMENTS

| | | | |
|---|---|---|---|
| 12,316,672 | B2 | 5/2025 | Senecal et al. |
| 2010/0070620 | A1 | 3/2010 | Awadallah et al. |
| 2016/0191554 | A1* | 6/2016 | Kaminsky ........... H04L 63/1425 |
| | | | 726/23 |
| 2017/0243003 | A1 | 8/2017 | Rapaport et al. |
| 2018/0041527 | A1* | 2/2018 | Call ...................... G06F 21/566 |
| 2018/0167412 | A1* | 6/2018 | Barrett ................ H04L 63/1491 |
| 2019/0141057 | A1 | 5/2019 | Burgis |
| 2020/0053121 | A1 | 2/2020 | Wilcox |
| 2020/0396233 | A1* | 12/2020 | Luo .......................... G06N 3/08 |
| 2021/0226987 | A1 | 7/2021 | Summers et al. |
| 2022/0191241 | A1 | 6/2022 | Vera-Schockner |
| 2023/0199023 | A1 | 6/2023 | Kurupati |
| 2023/0224325 | A1* | 7/2023 | Mautone ................. G06F 21/31 |
| | | | 726/22 |
| 2023/0336571 | A1 | 10/2023 | Costa et al. |

OTHER PUBLICATIONS

Lewandowski et al ("SpiderTrap—An Innovative Approach to Analyze Activity of Internet Bots on a Website", IEEE Access, Special Section on Emerging Approaches to Cyber Security, 2020). (Year: 2020).*
PCT/US2025/031528, International Search Report and Written Opinion, mailed Sep. 30, 2025, 9 pages.

* cited by examiner

BOT DETECTION AND MITIGATION USING DYNAMIC WEB FLOWS BUILT VIA MACHINE LEARNING

BACKGROUND OF THE INVENTION

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Technologies that detect malicious bot transactions on web and mobile applications are also well-known. These technologies typically work by analyzing attributes received from client devices, e.g., with data being collected on the client using a JavaScript-based approach to fingerprint clients and collect telemetry to evaluate the user behavior and differentiate bots from humans. Typical attributes include client device network, hardware, browser and software properties. Additionally, these techniques may also analyze human interaction events (e.g., mouse, keystroke timings, accelerometer and gyroscope data, touch activity, etc.) to check for human versus bot activity. Bot detection systems that leverage these types technologies can operate on a standalone basis at a website or in association with an edge network of a CDN.

Although bot detection and related mitigation technologies provide significant advantages, bot script writers continuously adapt and improve their attack scripts as they attempt to avoid detection. For example, consider a bad actor that uses scripts to scrape and extract prices from a website and/or to perform fraudulent transactions on stolen credit cards. A common attack strategy in this scenario involves the actor deploying low volume botnets using residential IP addresses to circumvent edge network rate limiting and to otherwise fly under the site's detection radar. The actor's script visits the target website and is presented with content-based workflows (e.g., sets of product pages) that are readily mined and potentially exploited.

SUMMARY OF THE INVENTION

An overlay network (such as a CDN) that includes a bot detection service is augmented to include a content generation service that dynamically generates dummy web pages or snippets that are served (along with real site content) to a requesting user that may or may not be a bot. This content is built using one or more machine learning models that are trained on a target website's content, or that otherwise leverage generative AI or graph-based neural networks to create site content that mimics the site's real content. The generated content, which is preferably built dynamically (on-the-fly) during an actual interaction session with the requesting user, is designed to "look" and "feel" like actual content of the website, and inclusion of the content (and, in particular, the browser's following of links within those pages or snippets) acts to trap a requesting user's browser in one or more non-productive (indeed, fake) navigation loops within the site. This facilitates the overall bot detection because such content and such loops are not actually part of the real site, and thus the fruitless navigation of these unproductive pages increases the cost to the attacker of the attack, slows down the volume of the attack, and itself is highly indicative of bot activity. The trapping of the bot in this manner facilitates faster or more consistent and accurate bot detection.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

Figure 1:
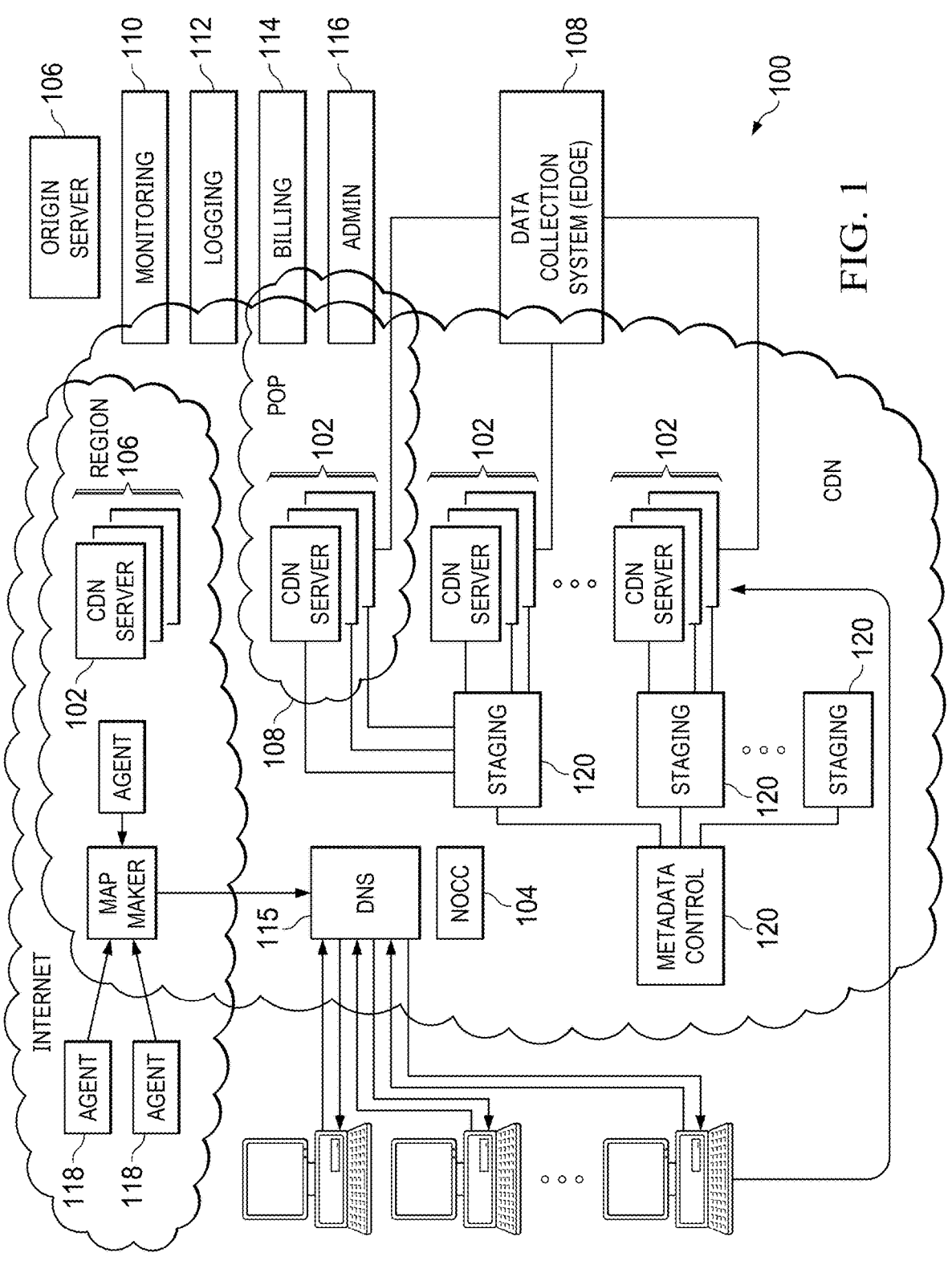
FIG. 1 depicts a known overlay network configured as a Content Delivery Network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
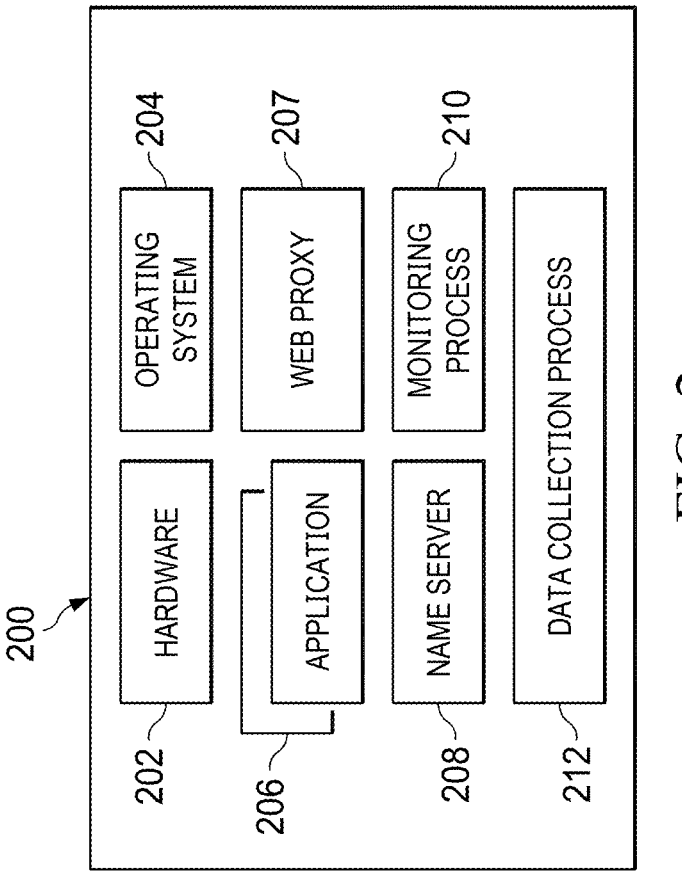
FIG. 2 depicts a typical edge machine configuration in the CDN.

As illustrated in FIG. 2, a given machine 200 comprises commodity hardware 202 running an operating system kernel (such as Linux or variant) 204 that supports one or more applications 206. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service.

To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon. In the above-described context, a "region" typically is a set of edge servers or machines that are co-located with one another.

An edge machine in the CDN may be implemented as a physical machine, or as a virtual machine, e.g., in a cloud-based infrastructure.

Figure 3:
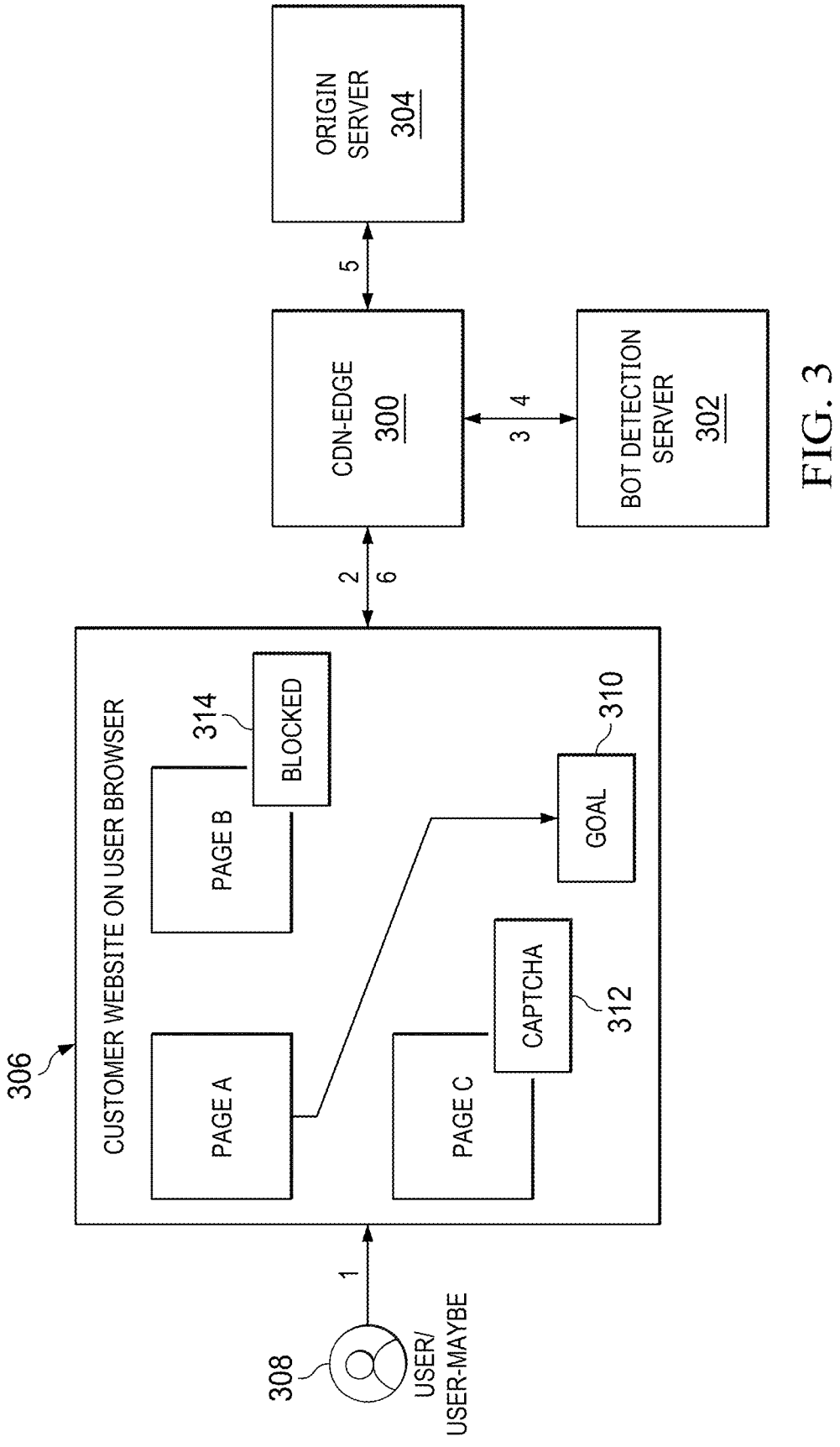
FIG. 3 depicts a typical end user interaction with a CDN that has been configured with a bot detection service.

As noted above, it is known in the prior art to integrate a bot detection system into an overlay network operating as a CDN. A representative system of this type is available commercially as Bot Manager, by Akamai Technologies, Inc. of Cambridge, Massachusetts. These types of security solutions protect CDN customer websites from scripted bot-like attacks. Generally, they work by classifying, in real-time, a transactional attempt done on a customer's website as either bot/human. When these technologies are in operation, humans generally do not see any differences in their navigation flows, and bots are either blocked or presented with a captcha-like solution, which is a program or system intended to distinguish human from machine input. In some scenarios, and depending on CDN customer configuration or practices, humans may also be presented with a captcha or, in certain cases, even blocked from performing a transaction. FIG. 3 depicts a representative solution and processing flow of this type.

As depicted, the CDN 300 has an associated bot detection server/service 302. An origin server 304 publishes the website that is being delivered by the CDN 300, and reference numeral 306 depicts the CDN customer website on the browser of the user 308, which may be a human or a bot. In this example, the site comprises a set of pages (Page A, Page B, Page C, etc.), and it is assumed that the user's navigation has a goal 310. Depending on how the navigation proceeds, the user may be presented with a captcha 312, or the user's navigation flow may be blocked 314. In particular, at step (1), the user 308 browses the customer website to reach some goal 310 (checkup, sign-up, transact, etc.). At step (2), the request is sent to the CDN edge along with collected telemetry. Typically, the telemetry is collected by execution of a JavaScript in the user's browser 306, e.g., as described in U.S. Pat. No. 11,374,945. At step (3), the edge forwards the telemetry to the bot detection server/service 302. At step (4), the service responds back to the edge, e.g., with a human/bot determination, or with a score (between 0 and 100) indicative of that determination. The service provider or the customer may tune a false positive (FP) or false negative (FN) threshold for the bot detection based on a risk profile. While tuning can provide advantages, there is a potential for FP if the threshold (e.g., block everything above a score of 70) is too aggressive, or for FN when the scores are not in an aggressive zone (e.g., bots below a score of 70 would get a free pass to the site along with humans if some indicators are strong). At step (5), the edge may take one of several actions, typically as driven by configuration and risk tolerance. These include: serve a challenge-like page (captcha or the like), drop the request (block the user), or forward the request to the origin 304. As indicated at (6), the actions taken at step (5) may result in different outcomes including that the user is blocked 314, the challenge 312 is presented, or that the user (bot or human) continues in its workflow.

Low volume bot transactions may occur in the above-described scenario, e.g., because they are under the thresholds and/or the customer FP risk low. In this scenario, the bad actor may continue to attempt to achieve its goal. Indeed, even when the detection system is responding with a bot indication, the actor may attempt to try some alternate attack vector or otherwise stay at a low volume to avoid the captcha. In addition, some customers may desire to avoid captcha or other challenge-like solutions because of their perceived impact on end user interaction with the site.

The techniques of this disclosure address these problems by providing for the creation and implementation of dynamic content-based workflows that appear indistinguishable from true human navigation flows on the site generally. The workflows are created using Artificial Intelligence (AI)/ Machine Learning (ML), as is now described.

Figure 4:
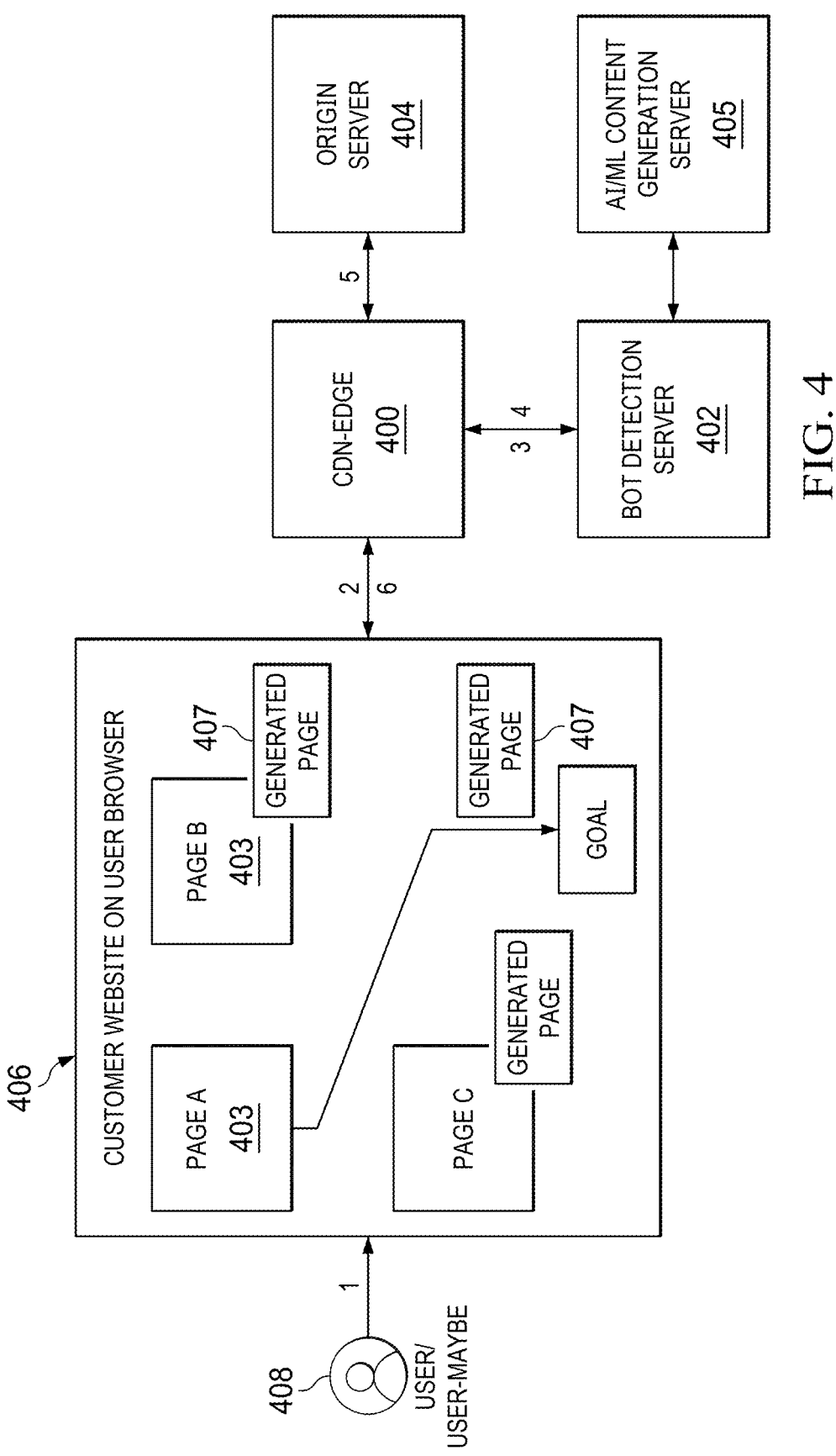
FIG. 4 depicts the system of FIG. 3 that has augmented to include a content generation server/service that is used to generate simulated or dummy pages that are useful to ensnare a bot or automated script into an endless navigation loop within a target site according to the techniques of this disclosure.

With reference to FIG. 4, the solution is similar to that shown in FIG. 3 except for the inclusion of a AI/ML generation server/service 405. The server/service 405 is not limited to a single device, as typically the service is implemented in a compute infrastructure or platform that include multiple service instances, load balancing and the like. The service 405 may be co-located with an edge network or remotely-accessible from that edge network. The service is typically associated with the CDN service provider, but this, too, is not necessarily required. As in FIG. 3, the CDN 400 has an associated bot detection server/service 402. An origin server 404 publishes the website that is being delivered by the CDN 400, and here reference numeral 406 depicts the CDN customer website on the browser of the user 408, which once again may be a human or a bot. In this example, the site comprises the set of actual site pages (Page A, Page B, Page C, etc.) 403, as well as a set of one or more ML-generated pages 407. As will be described, one or more machine learning models are used to generate the pages 407, and these models are generated by the service 405. The pages 407 provide for dynamic content-based workflows that appear to a bot to be realistic or otherwise indistinguishable from a real navigation workflow within the site. As such, the one or more generated pages (in association with zero or more actual pages 403 from the site) confuse the bot into browsing in a potentially endless navigation loop (sometimes referred to herein as a "dummy" loop or flow) and/or to tag and push the bot to an alternate pipeline (or dedicated area of the site) where the bot can be flagged and further processed by CDN or customer-specific mitigation systems or processes. The approach provides significant advantages as it enables the site to provide seamless workflows for humans (without captchas) while at the same time confusing bots or other scripted attacks, all without adding additional load on the origin server. To that end, and in this example, at step (1) the end user (whether real or a bot) browser makes one or more content request(s), which request(s) are passed to the edge at step (2) together with the browser-generated telemetry that will be used to facilitate the bot detection. In this scenario, the site comprises the actual pages 403 published by the origin, together with a set one or more ML-generated pages 407 generated by the generation service 405. If the user is a bot, the interaction with the dynamic content-based workflow (that includes the dummy pages 407) significantly enhances the ability of the bot detection service to determine the true nature of the user, as the generated pages preferably are designed with the goal of capturing the bot in an endless navigation loop that is difficult for the bot (or some command and control system that is controlling the bot) to otherwise detect. Information about the user's interaction(s) with the generated pages (and thus the endless navigation loop) is forwarded from the edge to the bot detection service to facilitate the bot determination/scoring (steps (3) and (4)), and thus the follow-on processing (steps (5) or (6). Typically, the bot is tagged and this information forwarded to the origin, or the bot is blocked or sandboxed. The attack is flagged and the bot detection system updated to reflect the relevant attack details (bot source IP address and network, time of day, etc.).

The following sections provide additional details regarding the machine learning that may be used to facilitate generation of one or more models that are used to generate the dummy pages.

Figure 5:
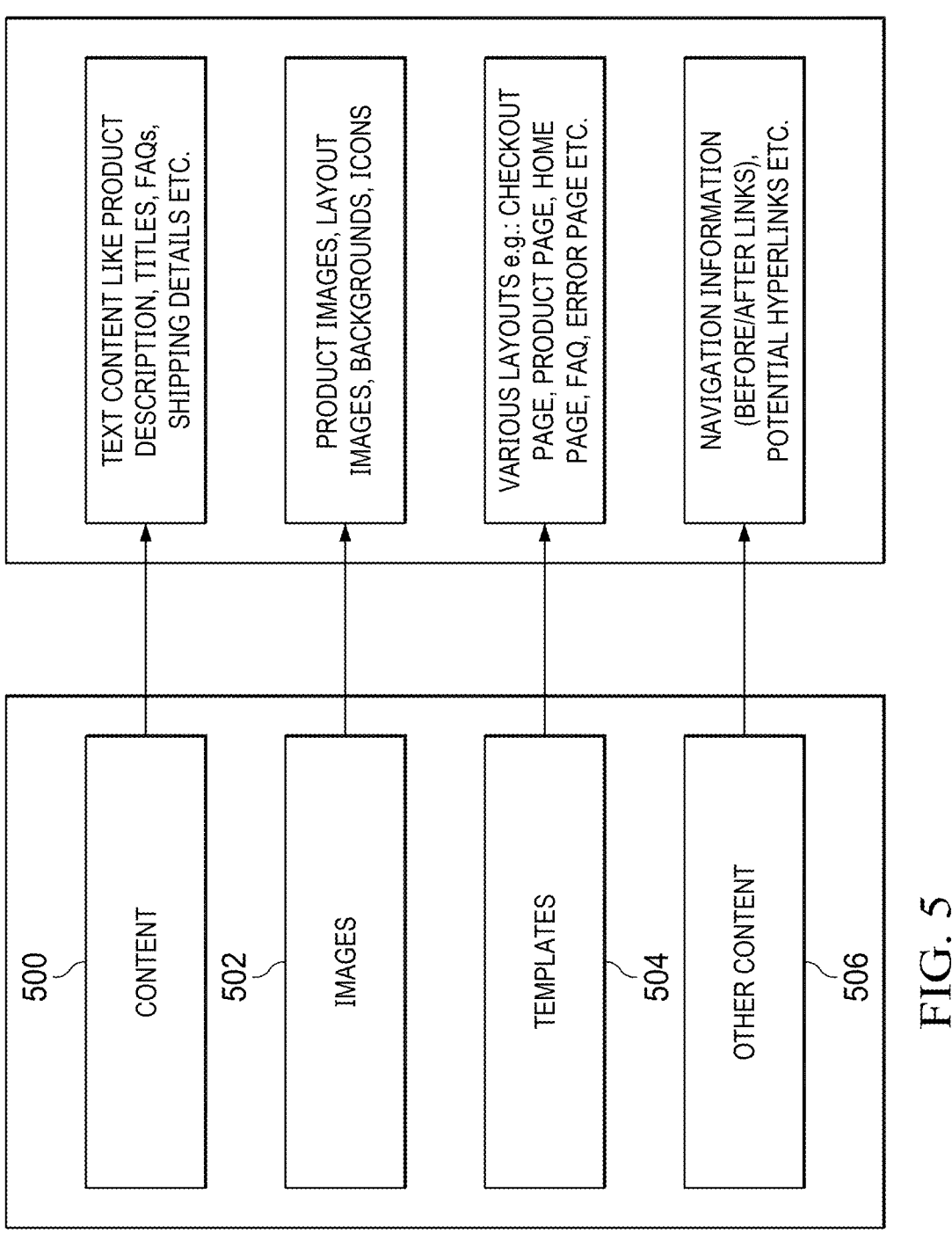
FIG. 5 depicts a set of site components and their associated ML models according to a modeling paradigm of this disclosure.

FIG. 5 depicts representative components of an ML modeling strategy. In this approach, preferably there are multiple categories of models that are generated, typically using the customer's existing website content (or updates thereto). The categories may vary but typically include one or more of: content 500, images 502, templates 504 and other content 506. In a typical e-commerce type of site, the content category 500 typically includes text content such as product description, title, FAQ, ordering and shipping details, and the like. In this type of site, images 502 typically comprise product images, layout images, icons and other graphics. Templates 504 might comprise various layouts such as a checkout page, a product page, a home page, an FAQ page, an error page, and the like. The other content 506 typically comprises navigation information (before and after links), potential hyperlinks, other page or site metadata, styles, and the like. Of course, the particular components of the models for each category depends on the type of site.

Typically, a "generated" or "dummy" page is a page that comprises a set of components corresponding to the categories identifies above. Thus, a dummy page comprises text and images, and it may be associated with a particular template and include other content. The individual component types (or sets of them) are generated from the ML modeling, and the resulting pages "look" and "act" like real pages of the site even though they do not have any purpose other than to ensnare a bot or automated script in an endless navigation loop. As used herein, the notion of "endless" does not necessarily imply something infinite in time, as the nature and scope of what navigation will be considered endless typically is context- and implementation-specific. Thus, for example, if a browser is caught in a navigation loop that moves from one checkout page to another intermediate page, and then to another (in the guise of an alleged checkout), then such movement itself may considered sufficiently "endless." Or, the notion of "endless" may be time-specific in the sense of involving a time-out; if the navigation through the loop of pages continues beyond the time-out, then the navigation is flagged as endless. Both movement and time may be involved in the consideration of whether the user is deemed to be caught up in the loop.

By way of additional background regarding training, machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Typically, ML tasks are classified in several ways. In supervised learning, an algorithm builds a mathematical model of a set of data that contains both the inputs and the desired outputs. For example, if the task were determining whether an image contained a certain object, the training data for a supervised learning algorithm includes images with and without that object (the input), and each image is given a label (the output) designating whether it contained the object. In supervised learning, the algorithm trains on labeled historic data and learns general rules that map input to output/target. The discovery of relationships between the input variables and the label/target variable in supervised learning is done with a training set, and the system learns from the training data. There are two subsets to supervised learning: regression techniques for continuous response prediction, and classification techniques for discrete response prediction. The most widely used supervised learning algorithms are Support Vector Machines, linear regression, logistic regression, naive Bayes, and neural networks (NNs). Semi-supervised learning algorithms develop mathematical models from incomplete training data, where a portion of the sample inputs are missing the desired output. In unsupervised learning, the algorithm builds a mathematical model of a set of data which contains only inputs and no desired outputs. Unsupervised learning algorithms are used to find structure in the data, like grouping or clustering of data points.

Figure 6:
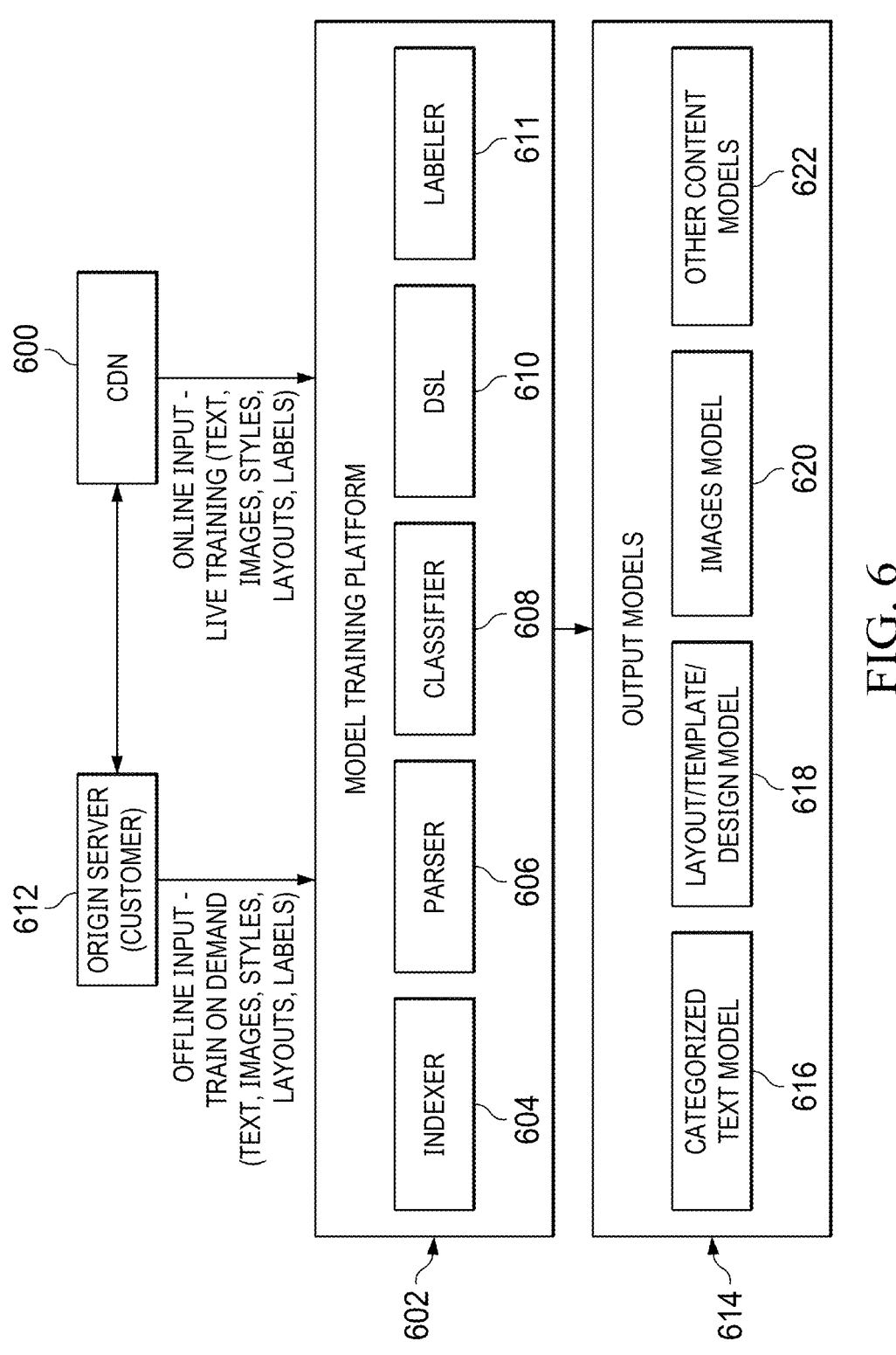
FIG. 6 depicts a training method and system for generating one or more Machine Learning (ML) models for use in the content generation server/service of FIG. 4.

FIG. 6 depicts a representative supervised training methodology using the CDN customer's site content. In this example, the CDN 600 operates a model training platform 602 that comprises an end-to-end training pipeline comprising set of components, namely, indexer 604, parser 606, classifier 606, a domain-specific language (DSL) component 608, and labeler 611. Here, the pipeline provides supervised learning, although this is not a limitation. The model training platform receives input data, typically off-line, from the customer's origin 612, and this input data typically comprises category-specific information such as text, images, styles, layouts, labels, and the like. This information is processed through the pipeline, which generates a set of output models 614, such as the categorized text model 616, a layout/template design model 618, an images model 620, and an other content model 622. It is not required that all of the different models be generated. Each such model may be thought of as a task-specific model that has been generated on well-labeled datasets. In an alternative embodiment, one or more general models that are trained on a broad set of unlabeled data and that can be used for different tasks with minimal fine-tuning may be used for this purpose. Models of this latter type are sometimes referred to as foundation models, and representative examples include natural language-based models like GPT-3 and BERT. A model of this type may leverage self-supervised learning and transfer learning to apply information it has learned about one situation to another.

In a particular embodiment, the ML training platform also leverages generative-AI, e.g., a transformer-based large language model (LLM). An LLM is a language model notable for its ability to achieve general-purpose language generation. LLMs acquire these abilities by learning statistical relationships from text documents during a computationally intensive self-supervised and semi-supervised training process. LLMs are artificial neural networks, the largest and most capable of which are built with a transformer-based architecture. Formally, a neural network is a function g: $X \rightarrow Y$, where X is an input space, and Y is an output space representing a categorical set in a classification setting (or a real number in a regression setting). For a sample x that is an element of X, $g(x) = f_L(f_{L-1}( \ldots ((f_1(x))))$. Each $f_i$ represents a layer, and $f_L$ is the last output layer. The last output layer creates a mapping from a hidden space to the output space (class labels), typically through a softmax function that outputs a vector of real numbers in the range [0, 1] that add up to 1. The output of the softmax function is a probability distribution of input x over C different possible output classes. The LLM may be native to the platform, or it may be a third party model that is accessible via a network-accessible application programming interface (API) or other request-response workflow. In this embodiment, one or more models are built using generative-AI.

The training platform may also leverage deep learning to create the one or more models. For example, one preferred (but non-limiting) deep learning approach is a graph neural network (GNN). GNN is a class of neural network for processing data of graph structures. In computer science, a graph is an abstract data type that implements so-called undirected or directed graphs (as those terms are known from the field of graph theory within mathematics). An abstract data type (ADT) is a mathematical model for data types. A graph data structure consists of a finite (and possibly mutable) set of vertices (also called nodes or points), together with a set of unordered pairs of these vertices for an undirected graph or a set of ordered pairs for a directed graph. These pairs are known as edges (also called links or lines), and for a directed graph are also known as arrows or arcs. The vertices may be part of the graph structure, or may be external entities represented by integer indices or references. A graph data structure may also associate to each edge some edge value, such as a symbolic label or a numeric attribute (cost, capacity, length, etc.). GNNs are a generalization to graph-structured data of convolutional neural networks, which are regularized versions of multilayer perceptrons (typically, fully-connected networks, that is, with each neuron in one layer connected to all neurons in the next layer). GNNs are applied to graphs directly to perform various types of learning tasks. In this embodiment, a GNN is used to facilitate the building of a model for use in the content generation server.

Typically, each site being protected by the content generation service has its own associated model(s) that are derived from the content of the target site that is desired to be protected. This is not a requirement, however, as the CDN (or other service provider) may provide the content generation service itself "as-as-service," in which case the model building (or at least some of it) may leverage third party web sites or pages as the relevant training data.

Further, and while the preferred approach here is to create a set of models from which the pieces or components of the dummy pages are generated, this is not a limitation, as the modeling platform may be used to generate a single model of a site or site page and from which the dummy pages are then generated.

Figure 7:
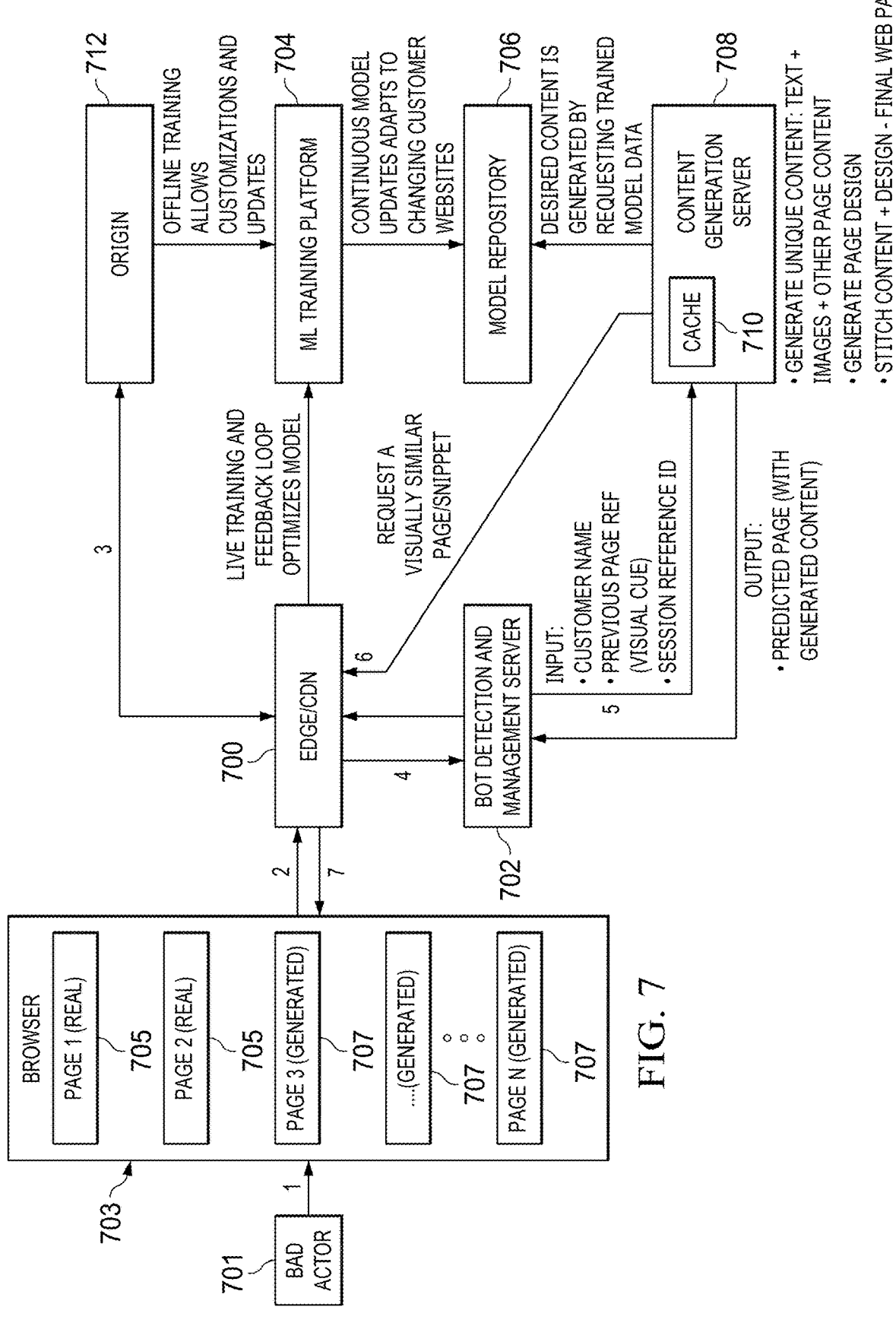
FIG. 7 depicts a detailed operation of a CDN system that includes the content generation server/service methodology of this disclosure.

FIG. 7 depicts a detailed processing flow with respect to a bad actor 711 that is executing a bot or other scripting attack on a target site (or portions thereof). The actor 701 has a computing machine running an associated browser 703 or other such application. As has been described, the browser 703 navigates a set of pages of the site that include real pages 705, together with the ML-generated pages 707 that are used to ensnare the bot or other automated script traffic. As described generally above, the system comprises the CDN or other edge network 700 and its associated bot detection and management server 702, as well as the back-end systems that comprise the machine learning-enabled content generation technique. To this end, those back-end systems include an ML training platform 704 (as in FIG. 6), a model data store/repository 706, and the content generation server 708. The server 708 has an associated cache 710. A customer origin 712 publishes the target site that is desired to be protected.

At step (1) the bad actor 701 is navigating a series of pages on the CDN customer website using the browser 703. At step (2), telemetry is collected by the bot detection script(s) in the delivered pages. Regular flows, namely, those that are not considered to be suspect, are forwarded to the origin 712 or otherwise served from the CDN edge network (if cached there). At step (4), the telemetry is sent to the bot detection and management server 702 in order to obtain a determination/score regarding the actor. At step (5), the bot detection and management server 702 issues a request to the content generation server 708. In this embodiment, this is a request for the content generation server 708 to generate a new page or a content snippet to embed into an existing page. To facilitate this process, the request may include certain information, such as the customer name, a previous page reference (visual cue), a session reference identifier (ID), and the like. Using that information, the content generation server may make its own request to the model repository 706 to obtain trained model data, namely, the parts of the "dummy" or simulated web page or snippet that will be built by the content generation service. The models in the repository are generated by the ML training platform as previously described, and preferably the models in the repository (corresponding to the individual components) are continuously updated as changes in the site are carried out at the origin. As depicted, the ML training platform may also receive off-line training to allow for customizations and updates to the one or more models that comprise the trained model data. As depicted, the content generation server receives the input request and the trained model data and generates preferably unique content comprising text, images and other page content, together with a page design. As depicted at step (6), and to facilitate the content generation, the process may also involve the content generation server 708 requesting that the CDN (edge network or server) return to it a visually similar page/snippet that can be used to facilitate the page design by the content generation server. The generated unique content (text, images and other content) provided by the model(s) is stitched into the page design, with the resulting web page or snippet then returned to the CDN edge network/server. Step (7) depicts the newly-generated page or snippet being served to the actor's browser where, as noted, it facilitates capture of the bot in the endless navigation loop. This processing cycle is then repeated for additional request(s) during the interaction session, thereby creating a set of one or more artificial workflows for the bad actor, in effect tar-pitting or sand-boxing the actor's browser in unproductive or useless navigation of these dummy pages. By forcing the bad actor into this type of loop, additional telemetry is then collected, and that telemetry may then be analyzed by the bot detection and management server to further the accuracy of the bot detection.

Enabling Technologies

Generalizing, the techniques herein may be implemented in or in association with a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics. The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

The heterogeneous network may leverage local data collection techniques that include, without limitation, active and passive data collection, data traffic monitoring, packet inspection, application layer-based, operating system kernel-based, and otherwise.

ML models may be updated periodically, continuously, synchronously, asynchronously, on-demand, or in response to a given event, occurrence or trigger. From a temporal perspective, the steady state may be short, medium or long term.

Particular machines/processes that implement the machine learning and share their knowledge to create emergent behavior according to the technique herein may be of any type including, without limitation, edge network computing nodes (which are typically rack-mounted in network-accessible data centers), Internet-of-Things (IoT) devices, cloud infrastructure-based computing nodes and resources, virtualized computing nodes, virtual machines, and the like.

The particular geographic and/or network extent of the model sharing is not intended to be limiting.

There may be many different types of machine learning techniques that may be used to facilitate a given collaboration, and more than one technique may be used by given subsets of edge machines that are cooperating or collaborating in this manner. The nature of the data sharing across nodes will depend on the type of model being built. In one embodiment, the machine learning is based on a K-nearest neighbor algorithm. This approach is useful for an edge network-based environment since much of the data being used already resides on the edge node. In this approach, a local model (associated with a given machine) trains on a set of exemplars that are learned from the data collected. Exemplars represent lossy compression of the input data that has been seen. The K-nearest exemplars are then shared with the nearby nodes, typically in the form of a data set vector. The node that receives this data then adjusts its local knowledge vector accordingly (e.g., by averaging in the new vector, finding a median, etc.) to create the adjusted model, which can then be applied to the overlay network optimization task at hand.

In another embodiment, neural networks are used for the learning. Neural networks here may perform in-band learning, or out-of-band learning. In-band learning involves keeping track of pieces of interesting data (e.g., anomalies), and then gossiping this data to the nearby nodes. In out-of-band learning, the neural network comprises a set of weights (floating point numbers over which various mathematical operations are performed), and it is the set of weights that are shared to facilitate the collaboration. To this end, a receiving node would take the weights received and incorporate them in its weight matrix/vector, or the like. Another approach to training a neural network is to create a trained lightweight model (in the manner described) and then share it to a subset of the other nodes.

The problem(s) being modeled by a particular model may be stationary or non-stationary.

Some edge nodes may use the described technique, while certain other nodes may be configured not to use the technique. A given node may provide this functionality only at certain times, or at certain times of day. A particular node may be managed by an overlay network configuration to provide a model in association with a particular constraint, e.g., a customer control, a domain, or the like.

The nature of the "browser" associated with a bot should be broadly construed. Typically, the browser is headless (e.g., CasperJS, PhantomJS, Selenium, NodeJS), and some bots operate without a browser, e.g., by using a script.

What is claimed is set forth below.

The invention claimed is:

1. A method of protecting a website, comprising:

during an interaction with the website initiated by a requesting client:

serving a set of one or more first pages that constitute actual content of the website;

selectively serving a set of one or more second pages that differ from the set of one or more first pages in that the one or more second pages do not constitute the actual content of the website but are configured to appear to the requesting client as though the one or more second pages do constitute the actual content of the website, the one or more second pages having been built dynamically during the interaction and based at least in part on one or more machine learning content models associated with the website; and based at least in part on receiving telemetry indicating navigation by the requesting client through the set of one or more second pages, characterizing the requesting client as a bot; and taking a given mitigation action against the requesting client to protect the website.

2. The method as described in claim 1 wherein the one or more machine learning content models comprises a set of models, wherein each of the set of models is trained on a category of content.

3. The method as described in claim 2, wherein the category of content is one of: text, images, page templates, and site metadata associated with site navigation.

4. The method as described in claim 1, wherein at least one second page of the set of one or more second pages has a page design that is generated based at least in part on a measure of visual similarity to at least a portion of a first page of the set of one or more first pages.

5. The method as described in claim 1, further including the one or more machine learning content models are trained out-of-band relative to the interaction.

6. The method as described in claim 1, wherein at least one machine learning content model of the one or more machine learning content models is built using generative-AI.

7. The method as described in claim 1, wherein at least one machine learning content model of the one or more machine learning content models is a neural network.

8. The method as described in claim 7, wherein the neural network is a graph neural network (GNN).

9. The method as described in claim 1, wherein at least one machine learning content model of the one or more machine learning content models is a model that has been updated out-of-band relative to the interaction.

10. The method as described in claim 1, wherein at least one machine learning content model of the one or more machine learning content models is trained on content of the website.

11. The method as described in claim 1, wherein the one or more first pages and the one or more second pages are served by an edge server of an overlay network.

12. The method as described in claim 11, wherein the given mitigation action is determined by a bot detection service associated with the overlay network.

13. The method as described in claim 1, wherein the requesting client is a page scrapper.

14. The method as described in claim 1, further including the website is configured for use without a captcha.

15. The method as described in claim 1, wherein the given mitigation action is one of: blocking an action requested by the requesting client, logging the interaction, issuing a notification, and tar-pitting or sand-boxing the requesting client.

16. An apparatus configured to protect a website, comprising: one or more hardware processors;

computer memory holding computer program code executed by the one or more hardware processors, the computer program code configured during an interaction with the website initiated by a requesting client to:

serve a set of one or more first pages that constitute actual content of the website;

selectively serve a set of one or more second pages that differ from the set of one or more first pages in that the one or more second pages do not constitute the actual content of the website but are configured to appear to the requesting client as though the one or more second pages do constitute the actual content of the website, the one or more second pages having been built dynamically during the interaction and based at least in part on one or more machine learning content models associated with the website;

based at least in part on receiving telemetry indicating navigation by the requesting client through the set of one or more second pages, characterize the requesting client as a bot; and take a given mitigation action against the requesting client to protect the website.

17. The apparatus as described in claim 16, wherein the given mitigation action is one of: blocking an action requested by the requesting client, logging the interaction, issuing a notification, and tar-pitting or sand-boxing the requesting client.

18. A computer program product in a non-transitory computer-readable medium, the computer program product comprising computer program code executable by one or more hardware processors to protect a website, the computer program code configured during an interaction with the website initiated by a requesting client to:

serve a set of one or more first pages that constitute actual content of the website;

selectively serve a set of one or more second pages that differ from the set of one or more first pages in that the one or more second pages do not constitute the actual content of the website but are configured to appear to the requesting client as though the one or more second pages do constitute the actual content of the website, the one or more second pages having been built dynamically during the interaction and based at least in part on one or more machine learning content models associated with the website;

based at least in part on receiving telemetry indicating navigation by the requesting client through the set of one or more second pages, characterize the requesting client as a bot; and take a given mitigation action against the requesting client to protect the website.

19. The computer program product as described in claim 18, wherein the given mitigation action is one of: blocking an action requested by the requesting client, logging the interaction, issuing a notification, and tar-pitting or sand-boxing the requesting client.

20. The computer program product as described in claim 18, wherein the given mitigation action is taken at an edge server of an overlay network.

* * * * *